United States Patent

Wiking

[11] 3,727,364
[45] Apr. 17, 1973

[54] METHOD FOR OPENING PLASTICS-FOIL WRAPPED PACKAGES

[76] Inventor: Lars Wiking, Taubeyatan 5, Goteborg, Sweden

[22] Filed: Aug. 17, 1971

[21] Appl. No.: 172,423

[52] U.S. Cl. ...................................................53/3
[51] Int. Cl. ...........................................B65b 69/00
[58] Field of Search .....................53/3; 206/246 PV, 206/65 S

[56] References Cited

UNITED STATES PATENTS 3,349,900  10/1967  Jones et al. .........................206/62 R Primary Examiner—Andrew R. Juhasz
Assistant Examiner—John Sipos
Attorney—Holman & Stern

[57] ABSTRACT

Uniform articles, such as glass bottles and jars, are often for transportation formed into packages which are wrapped in a thermo-shrinking plastic foil. Such foil is very strong and the opening of such packages have proven to be a very tedious operation. When large quantities of such packages are to be handled the opening must be performed automatically in a machine and to that end the packages must be of uniform size and shape. Even if the foil is very strong it often happens during the shrinking operation, or later during transportation, that the basically parallelepiped package is deformed, which means that the individual articles are interlocked still harder and the removal of the wrapper made more difficult. The invention proposes the injection of a suitable lubricant in finely divided state into the package prior to the removal of the wrapper. It will then be remarkably easy to rearrange the articles within the package and to peel off the wrapper therefrom.

5 Claims, 5 Drawing Figures

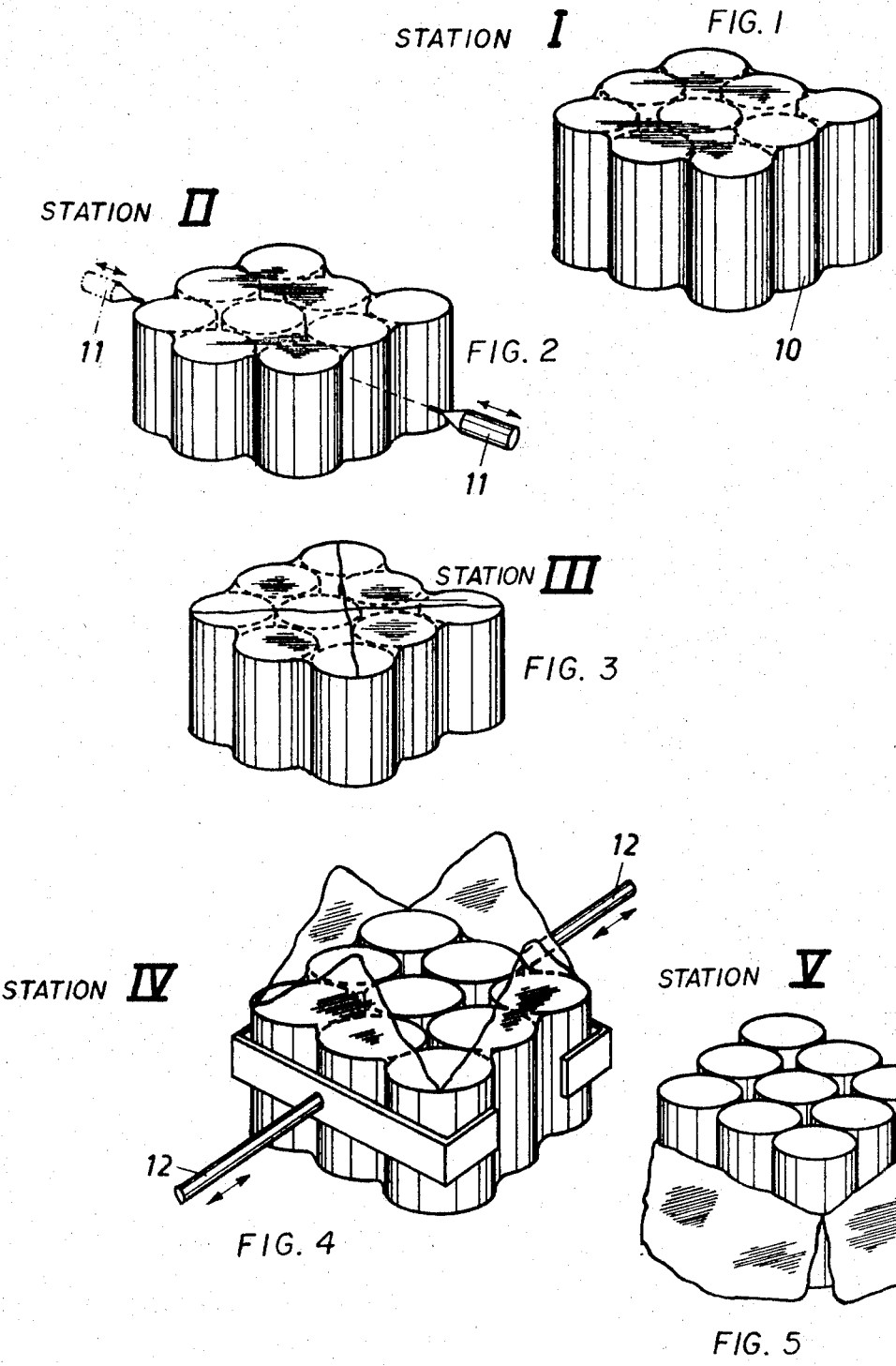

3,727,364

METHOD FOR OPENING PLASTICS-FOIL WRAPPED PACKAGES

BACKGROUND OF THE INVENTION

The present invention refers to a method for facilitating the opening of packages consisting of a wrapper of thermo-shrinking plastic-foil enclosing a number of articles formed into a transport unit having a basically parallel-epiped form, within which the individual articles are strongly maintained in their relative position due to the pressure thereon of the shrunken foil.

Glass bottles and jars are often at the glassworks formed into such transport units, which due to the strength of the foil are self-supporting. Before the foil wrapper is shrunk the bottles, or jars, are arranged into the desired shape of the unit and when the foil has been shrunk they are strongly maintained in their relative position and will usually be able to endure a rather severe handling during transportation. This type of transport handling has proven superior to the former manner of handling in which the bottles were shipped in boxes or crates, but the opening of these packages is very tedious and often leads to damage of the articles due to the strength of the foil.

During the shrinking operation, and especially during the transportation, it often happens that the basically straight-angled, parallel-epiped unit is deformed by the sides thereof being angularly displaced, or that one row of bottles is displaced in relation to the other rows whereby one side of the unit caves in and the opposite side bends outwards. When large numbers of such units are to be handled it is important that the units are of uniform shape, and are parallel-epiped to make possible the handling thereof in machines. Due to the pressure of the foil upon the bottles it is practically impossible to rearrange the bottles without an apparent risk of breaking some of them, or even to cause damage to the machine handling the units.

SUMMARY OF THE INVENTION

The aim of the present invention is to provide a method for diminishing the difficulties involved in the opening of heat-shrunk, plastic foil wrapped transport units and it is characterized in that the foil wrapper prior to opening is punctured and a quantity of a suitable lubricant is injected in finely divided state into the package, thereby to reduce the friction between the articles as well as between the latter and the surrounding foil.

BRIEF DESCRIPTION OF THE DRAWING

FIGS. 1–5 illustrate schematically the steps during the opening of a package.

DESCRIPTION OF THE PREFERRED EMBODIMENT

The means for working the method may consist of a spraying apparatus of known design, operating with compressed air, which passes through a throat or nozzle where the air due to ejector action draws a liquid along and sprays the latter in a fog-like cloud. The liquid may be a soapy water solution, or kerosene, or any other medium which when finely divided and distributed between adjacent surfaces diminishes the friction therebetween. On this occasion the nozzle through which the medium is sprayed is designed as a lance, or is otherwise provided with a pointed end to make it fit to puncture the plastic foil.

The various steps during the opening of a package is schematically shown in the accompanying drawing.

A package containing a number of uniform articles, say glassbottles, are at a manufactory or plant formed into a package wrapped in heat-shrinking plastic foil. For the sake of simplicity only three rows of three bottles each is shown, In practice the number of articles in each package will be much greater.

During the transportation the package may have been somewhat deformed, and at a consumer it is now desired to break up a number of such packages in a continuous flow.

The packages 10 are placed on a conveyor belt, not shown, at station I (FIG. 1), and will at a steady flow rate pass along the belt, Each package is first brought to a station II (FIG. 2), where the anti-friction medium is introduced into the package. Two pointed injection nozzles 11 are shown, which are moved in the horizontal plane forwards and backwards in time with the conveyor. The nozzles are mounted in such a manner that they at each forward movement will puncture the wrapper and extend into the package to a sufficient extent to facilitate the spraying of the antifriction medium within the package.

Although two nozzles are shown only, it is evident that the number of such nozzles will have to be suited to the size of the package and that the nozzles may equally well move in the vertical direction, to puncture the top and the bottom of the package. The articles are of uniform size and the package is governed into such a position at station II that the nozzles will not strike directly against an article, but will enter the space between two adjacent articles.

At station III (FIG. 2) an apparatus, not shown cuts the top of the package open, on this occasion by making two incisions diagonally across the same.

Thereafter the package is brought to station IV (FIG. 4), where it is rearranged to a straight-angled parallel-epiped unit. Two pusher units 12, each provided with a pressure plate, are movable in the horizontal plane forwards and backwards to act upon the longitudinal sides of the package. Similar pusher units, not shown, will simultaneously act upon the front and the back side of the package.

The operation at station IV is by itself well known in the art and does not form any part of the invention. The remarkable thing is, however, that the injection of the anti-friction medium into the still closed package at station II, which is the essential part of the invention, permits the re-arrangement of the articles within the package with such ease and without any risk of breakage of the articles. Even if the top of the package is cut open all four sides are still intact and the lateral pressure of the shrunk foil upon the bottles, is still maintained.

The re-formed package is then brought to station V (FIG. 5) where the foil wrapper is peeled off by any suitable machine, not shown, which however, preferably contains a frame having the same internal measure as the group of articles. This frame is pushed downwards over the package, squeezing the foil downwards. The peeling-off is of course also made easier as the surfaces between the outermost articles and the wrapper has been "lubricated." The bottles are then gripped by any suitable machine and lifted free of the demolished wrapper.

The operation schematically shown in the drawing may be rearranged and made to include further steps to adapt the procedure to various needs and types of articles. The procedure is illustrated only to give a frame to the important step, namely the injection of the antifriction medium at station II.

What I claim is:

1. In a method for facilitating the operating of a package consisting of a wrapper of thermo-shrinking plastic foil enclosing a number of articles formed into a transport unit having a basically parallel-epiped form, within which the individual articles are strongly maintained in their relative position due to the pressure thereon of the shrunken foil, the improvement of puncturing the foil at least at one point and injecting into the package a quantity of lubricant to reduce the friction between the articles as well as between the latter and the surrounding foil.

2. The method according to claim 1, in which the lubricant is liquid and is injected into the package in a finely divided state carried by compressed air.

3. The method according to claim 2, in which the lubricant is a soapy water solution.

4. The method according to claim 2, in which the lubricant is kerosene.

5. The method according to claim 1, in which the package, after the injection of lubricant is re-formed to a parallel-epiped unit and the wrapper thereafter is peeled off.

* * * * *